(12) United States Patent
Schleit et al.

(10) Patent No.: US 10,783,132 B1
(45) Date of Patent: Sep. 22, 2020

(54) SYSTEM FOR MAINTAINING PRECOMPUTED VALUES DETERMINED FROM DATA SOURCES

(71) Applicant: AMAZON TECHNOLOGIES, INC., Seattle, WA (US)

(72) Inventors: Andrew Christopher Schleit, Seattle, WA (US); Andrei N. Krotkov, Seattle, WA (US); Shen Li, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 834 days.

(21) Appl. No.: 14/974,682

(22) Filed: Dec. 18, 2015

(51) Int. Cl.
| | | |
|---|---|---|
| *G06F 16/23* | (2019.01) | |
| *G06F 16/248* | (2019.01) | |
| *G06F 16/25* | (2019.01) | |
| *G06F 16/9535* | (2019.01) | |
| *G06F 16/2457* | (2019.01) | |

(52) U.S. Cl.
CPC .......... *G06F 16/23* (2019.01); *G06F 16/248* (2019.01); *G06F 16/24575* (2019.01); *G06F 16/258* (2019.01); *G06F 16/9535* (2019.01)

(58) Field of Classification Search
CPC ......... G06F 17/30345; G06F 17/30528; G06F 17/30554; G06F 17/30569; G06F 17/30867; G06F 16/23; G06F 16/258; G06F 16/24575; G06F 16/9535; G06F 16/248

See application file for complete search history.

(56) References Cited

U.S. PATENT DOCUMENTS

| | | | |
|---|---|---|---|
| 6,480,839 B1* | 11/2002 | Whittington | G06F 16/2471 |
| 2009/0112794 A1* | 4/2009 | Dettinger | G06F 16/972 |
| 2015/0112922 A1* | 4/2015 | Zhou | G06F 16/2393 |
| | | | 707/609 |
| 2017/0024203 A1* | 1/2017 | Dayan | G06F 8/71 |

* cited by examiner

*Primary Examiner* — Mark D Featherstone
*Assistant Examiner* — Faezeh Forouharnejad
(74) *Attorney, Agent, or Firm* — Lindauer Law, PLLC

(57) ABSTRACT

Described are techniques for maintaining the accuracy of a precomputed output by determining sets of instructions for accessing and extracting values from individual data sources used to determine the output. Responsive to the determination of a modification to data in the data source, the data sources may be accessed to determine values that may be used to modify the precomputed output. The sets of instructions for accessing the data sources may be determined based on the relationships between different data sources and between one or more data sources and the output.

20 Claims, 7 Drawing Sheets

SYSTEM FOR MAINTAINING PRECOMPUTED VALUES DETERMINED FROM DATA SOURCES

BACKGROUND

Data that is output to a user responsive to a query may be determined from a variety of dynamic data sources, such that the output may change as the data within the data sources changes.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
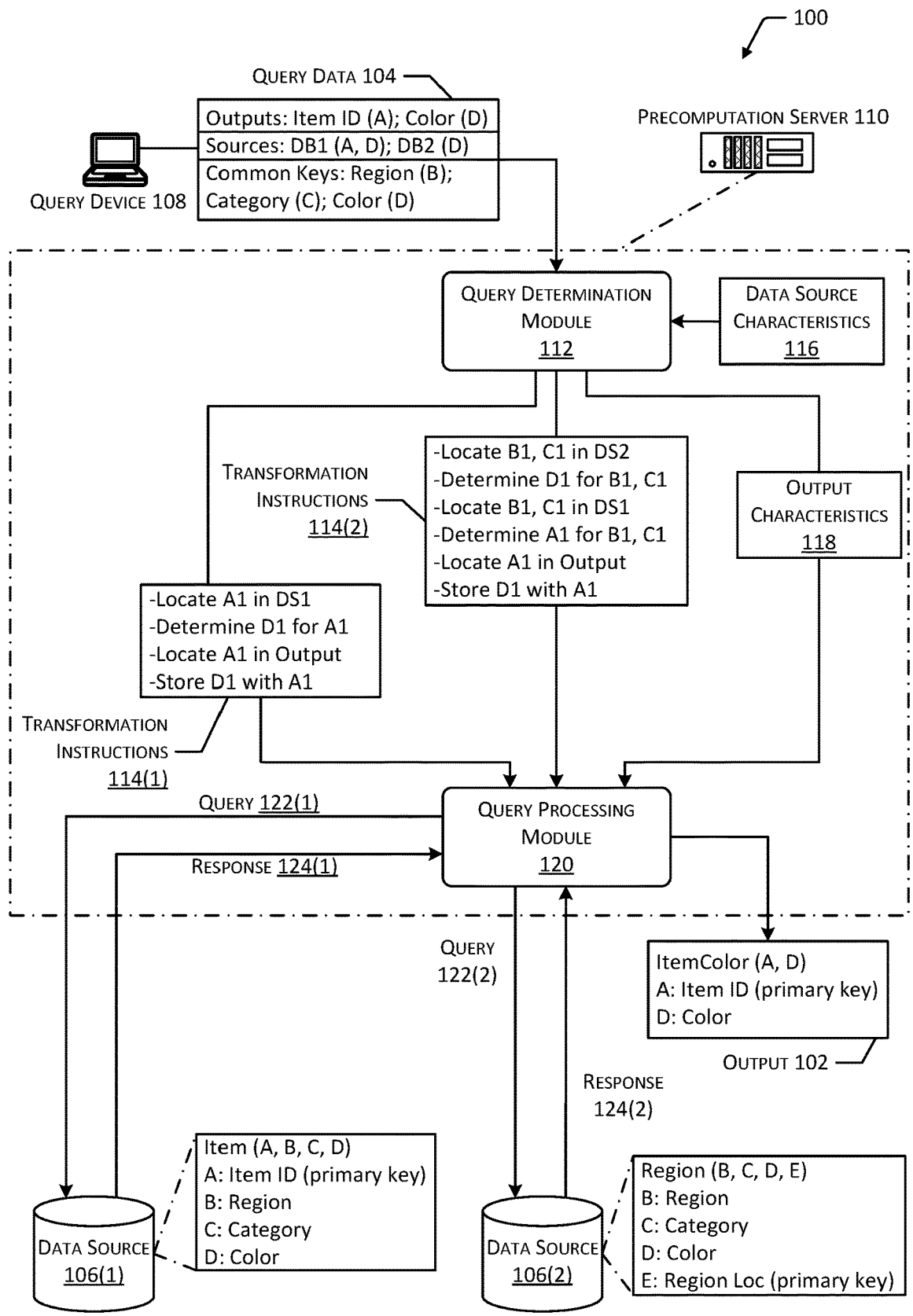
FIG. 1 depicts a system for determining an output based on query data for accessing multiple data sources.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

When a user provides a query to a system to determine a particular output, the output may depend upon data from multiple databases or other data sources. Such data sources may include, for example, relational databases in which each record (e.g., a row or tuple) is uniquely identifiable from other records by a key value, which may include one or multiple attributes (e.g., columns) associated with the record that are not identical with those of another record. For example, a key value may include a unique number (e.g., an identifier) assigned to the record. As another example, a key value may include a set of attributes of the record that, in combination, are not identical to the corresponding attributes of other records in the database. Continuing the example, a user may query an online marketplace to determine a particular characteristic of an item. Responsive to this query, the online marketplace may access a first database associated with a catalog of items for sale, a second database associated with a geographic market associated with the item, a third database associated with a category of the item, and so forth. In some cases, generation of a response to a query may include execution of multiple processes to interrogate a potentially large number of data sources, many of which may include different formats, different key values, and different methods by which particular information may be located and extracted. As such, generation of a query response may consume significant computing resources and cause the user providing the query to experience latency. To reduce latency and the use of computing resources, one or more outputs, such as responses to queries that are commonly received, may be precomputed and stored in a separate data structure. Responsive to a subsequent query to determine a particular output, the data structure containing the output may be accessed to provide the pre-generated output to the requesting device without requiring the initial processes to generate the output to be performed responsive to the query.

However, in some cases, the data within the data sources from which a precomputed value was determined may be changed. For example, a precomputed output for a particular set of laptop computers may include a number of Universal Serial Bus (USB) ports present in each of the computers. If the data pertaining to a particular computer is modified to change the number of USB ports, the precomputed value for that item would no longer be accurate. When the data source containing the modified value and the data structure of the output include the same key values (e.g., an identifier for an item and an indication of a quantity of USB ports), modification of the output responsive to a modification to the data source may simply include updating or replacing particular data within the output using modified data from the data source. However, in many cases, the data structure of the output may include different key values than one or more of the data sources used to determine the output. In such cases, to recompute an output responsive to a change in a data source, a transformation based on the relationship between the key values of the output and those of the data source must be performed. In other cases, the multiple data sources used to determine an output may themselves be related. For example, a first data source may not include all of the attributes necessary to update a record in the output, but based on a common key shared by the first data source and a second data source, the corresponding attributes may be determined from the second data source.

Described in this disclosure are techniques for analyzing a query used to determine an output based on multiple data sources and generating multiple sets of instructions, each set of instructions configured to determine at least a portion of an output from a particular data source. The relationships between the data sources and the output, such as the key values that are common or unique to each data source and the output, may be used to determine the particular transformation that may be performed to determine an output from a particular data source. For example, a first database associated with a catalog of items for sale in a particular region may reference each item by a unique item identifier, an identifier associated with the geographic region(s) where the item is sold, an identifier associated with a category of the item, an identifier associated with a condition of the item, an identifier associated with the color of the item, and so forth. The unique item identifier may constitute the primary key value of the first database. A second database associated with a different region may refer to the "color" attribute as "roleC". A precomputed output may include the color for one or more items. Responsive to a change in the first database, the value associated with the "color" attribute of the changed item may be retrieved and used to replace or modify a corresponding portion of the output. However, responsive to a change in the second database, the attribute "color" would be absent. Based on the known relationship between the attributes "color" and "roleC", the corresponding value associated with the "roleC" attribute of the changed item in the second database may be retrieved and used to replace or modify a portion of the output.

As another example, a first database associated with a catalog of items for sale may reference each item by a unique item identifier, an identifier associated with the geographic region(s) where the item is sold, an identifier associated with a category of the item, an identifier associated with a condition of the item, an identifier associated with the color of the item, and so forth. A second database associated with a geographic region may include an identifier associated with the geographic region but may not include the item identifier for the items sold in the region. Responsive to a change associated with an item in the first database, the key value associated with the item identifier for the changed item may be determined to enable replacement or modification of a corresponding portion of the output. However, if a change is made to the second database, the key value associated with the item identifier would be absent. Based on the known relationship between the first and second databases, namely the common key value associated with the geographic region, a transformation operation to determine the output based on the modification to the second database may be determined. For example, the transformation operation may include performing a backfill operation to modify the first database based on the change to the second database, then determining the output based on the first database. As another example, the transformation operation may include accessing the first database to determine the key value associated with the item identifier for use generating the output based on the second database.

Query data associated with a query to determine an output may include data indicative of the output to be determined, data indicative of the particular data sources used to determine the output, and query instructions indicative of the manner in which the output is determined. For example, the query instructions may indicate particular key values to locate within a first data source to determine a first portion of the output and other key values to locate within a second data source to determine a second portion of the output. In some implementations, the query data may also include an indication of a relationship between the data sources and the output, such as key values that are common to multiple data sources and key values that are common between particular data sources and the output. For example, query data may include a query provided by a user to determine a particular output, such as the logic, expressions, and so forth, used to determine and extract values from data sources. In some cases, a common key value present in multiple data sources may include different names, identifiers, positions, and so forth, in different data sources. In such cases, the common key value may be derived via a transformation operation based on this known relationship. For example, as described previously, a particular database may include the attribute "roleC", which may correspond to the attribute "color" in other databases. A transformation operation may determine the value for the "roleC" attribute from the database, then store this value in association with the "color" attribute of the output. Continuing the example, the query data may indicate particular output key values, a format of the output, and so forth. As such, portions of the output determined from the data sources may be stored in association with one or more output key values. Based on the relationship between the output key values and the key values of the data sources, transformation operations may be performed on data determined from the data sources to produce the output.

After a set of transformation instructions for a data source has been determined, the instructions may be executed if a particular portion of the data source is subsequently modified. For example, an output indicative of the color of one or more items available for purchase may be precomputed. Responsive to a modification to a database of items that changes the color of a particular item, a set of transformation instructions associated with the database may be executed. The transformation instructions may be configured to determine values associated with the attributes "Item_Identifier" and "Item_Color". The transformation instructions may further be configured to store the determined value for "Item_Color" in an output data structure, in association with the common key value "Item_Identifier". In the output data structure, the values determined for "Item_Color" may be referenced using a different term for the key value, such as "Color_of_Item".

In some implementations, concurrent or parallel execution of transformation instructions may be prevented, such as through use of locks and join operations, to maintain the accuracy of the output. For example, if concurrent modifications to two data sources are determined and each of the key values in the first data source is present in the second data source, the processes to update the output based on the data sources may be joined as a single operation based on the second data source. As another example, a process to update a first portion of an output may be initiated responsive to a modification to a first data source. During execution of this process, a modification to a second data source having one or more key values in common with the first data source may be determined. If transformation instructions associated with the second data source were executed prior to completion of the process to update the first portion of the output, the transformation instructions associated with the second data source may execute using stale or inaccurate data. By ensuring that each process associated with data sources having common key values is executed in series rather than in parallel, the accuracy of the output may be maintained. In some implementations, the locks used in association with the data sources may be based on a hierarchy of data sources. For example, if a greater number of key values are known for a first data source when compared to a second data source, processes associated with the second data source may include accessing the first data source to determine additional key values not present in the second data source. As another example, key values associated with the first data source may be accessed by operations associated with the second data source based on the key values associated with the first data source having a greater access frequency than key values associated with the second data source. In other implementations, one or more data sources or key values may be assigned a priority level, such as via user input, and processes may be prioritized based on the respective priority levels of the one or more data sources or key values.

In some implementations, a modification to a data source may cause the addition of one or more attributes to an output. For example, a characteristic of an item, such as a number of USB ports of a laptop computer, may be added to a database associated with items offered for sale. Responsive to this modification, a precomputed output that includes characteristics of one or more laptop computers may be modified to include an indication of a number of USB ports for one or more of the computers. In other implementations, a modification to a data source may cause the deletion of one or more attributes from an output. For example, an indication of a number of USB ports may be deleted from one or more records. Responsive to this modification, existing portions of the output may not necessarily be changed. However, in some implementations, correspondence between the portions of the output determined subsequent to the modification and consistency data based on a previous version of the output may be determined. If the consistency data includes additional values, such as an indication of USB ports or another attribute not present in the most recent version of the output, the additional data may be deleted from the output.

In some implementations, when a modification to a data source is determined, one or more of the modified portion of the data source, the output that depends from the data source, or the transformation instructions used to generate the output may be provided to a computing device remote from the data source or the data store storing the output. For example, particular operations to modify or update a data source or the output may consume a significant quantity of time or computing resources. Continuing the example, a modification to a particular data source may cause a backfill associated with the output or one or more other data sources. To prevent interference of the backfill operation on other interactions with the data source or the output, the backfill operation may be performed remotely. After completion of the backfill operation, the update records may be provided to the original data sources. In some implementations, if a data associated with the output or a data source is updated during execution of a remote process, an indication of this update may be maintained. When the remote process is complete, the indication of the update may be determined and the particular data to which the indications pertain may be retained rather than overwritten by data from the remote process.

FIG. 1 depicts a system 100 for determining an output 102 based on query data 104 for accessing multiple data sources 106. For example, a user associated with a query device 108 may provide query data 104 to a precomputation server 110 to cause an output 102 indicated by the query data 104 to be precomputed for subsequent access (e.g., responsive to a query provided to a data store associated with the output 102). While FIG. 1 depicts the precomputation server 110 as a single server, the precomputation server 110 may include any number and any type of computing devices, such as mobile devices, set-top boxes, tablet computers, personal computers, wearable computers, servers, and so forth. For example, the functions described in association with the precomputation server 110 may be performed using multiple computing devices distributed across one or more networks. Additionally, while FIG. 1 depicts a single query device 108 providing a single query data 104 to the precomputation server 110, any quantity of query data 104 may be determined from any number and any type of computing devices, including without limitation the types of computing devices described with regard to the precomputation server 110.

The query data 104 may include an indication of the output 102, an indication of the data sources 106 from which the output 102 may be determined, and query instructions that may be used to determine at least a portion of the output 102 from particular data sources 106. For example, query instructions may include code, logic, processes, and so forth that may locate particular records within a data source 106, extract values from the located records, and store the values in association with other records as part of the output 102. Continuing the example, the query data 104 may be configured to determine a characteristic of one or more items associated with an online marketplace. As such, the query data 104 may indicate that the output 102 will include an item identifier (e.g., "Item ID (A)") stored in association with the indication of an item color (e.g., "Color (D)"). The query data 104 shown in FIG. 1 indicates two example data sources 106 from which the output 102 may be determined: a first data source 106(1) that may include both item identifiers and item colors (e.g., "DB1 (A, D)") and a second data source 106(2) that may include item colors (e.g., "DB2 (D)"). As part of the query instructions, the query data 104 may also include indications of relationships between the data sources 106, such as one or more key values (e.g., attributes) that are common to both data sources (e.g., "Region (B); Category (C); Color (D)").

Continuing the example, the first data source 106(1) may include a database associated with a catalog of available items. FIG. 1 depicts the first data source 106(1) as a relational database (e.g., "Item (A, B, C, D)") that includes four attributes: an item identifier (e.g., "A: Item ID"), a region associated with sale of an item (e.g., "B: Region"), a category associated with the item (e.g., "C: Category"), and a color associated with the item (e.g., "D: Color"). In the depicted example, the item identifier may constitute the primary key of the first data source 106(1). For example, the item identifier may include a unique alphanumeric string assigned to each record that is not identical with the identifier of any other record in the first data source 106(1). The second data source 106(2) may include a database associated with a regional marketplace in which items are available. FIG. 1 depicts the second data source 106(2) as a relational database (e.g., "Region (B, C, D, E)") that includes four attributes: a region associated with sale of an item (e.g., "B: Region"), a category associated with the item (e.g., "C: Category"), a color associated with the item (e.g., "D: Color"), and a region location, such as coordinates or another specific location, of the region (e.g., "E: Region Loc"). The region location may constitute the primary key of the second data source 106(2). For example, the region location may include coordinates associated with a navigational system, such as Global Positioning System (GPS), indicative of the location of a particular store, warehouse, distribution center, office, or other facility. The regional location for a region may therefore include a unique alphanumeric string that is not identical with the identifier of any other record in the second data source 106(2). Based on the attributes associated with the first data source 106(1) and the second data source 106(2) and the attributes associated with the output 102, the color attribute in the output 102 may be determined from both data sources 106, while the item identifier is only present in the first data source 106(1). While FIG. 1 depicts two example data sources 106 that include relational data bases, in other implementations, any number and any type of data sources 106 having any manner of data structure may be used, including, without limitation, flat files, non-relational databases, linked lists, trees, executable codes, scripts, and so forth.

A query determination module 112 associated with the precomputation server 110 may determine the query data 104 from the query device 108 and generate sets of transformation instructions 114 configured to determine portions of the output 102 from the data sources 106. For example, based on the query data 104, the query determination module 112 may determine the key values associated with the output 102, the particular data sources 106 from which the output 102 may be determined, relationships between the data sources 106, such as common key values, and query instructions for accessing particular records or values from the data sources 106 and storing the particular records or values as part of the output 102. In some implementations, the query determination module 112 may also access data source characteristics 116 indicative of one or more of the format, attributes, key values, or other means by which the data sources 106 may be accessed, queried, and so forth. For example, in place of or in addition to the query data 104, the data source characteristics 116 may include indications of key values, common keys, or other relationships between data sources 106. As another example, the data source characteristics 116 may indicate query languages used by the data sources 106, communication channels by which the data sources 106 may be accessed, access credentials, encryption schema, or other security controls that may be used to access the data sources 106, and so forth. The query determination module 112 may also determine output characteristics 118 from one or more of the query data 104 or data source characteristics 116 associated with a data store in which the output 102 may be stored. The output characteristics 118 may include an indication of the format, key values, communication channels, query languages, security controls, and so forth, associated with the output 102 or the data store in which the output 102 is stored.

The transformation instructions 114 may include data indicative of a process for extracting one or more particular values from a specific individual data source 106, based on the relationships between the output 102, the specific data source 106, and other data sources 106. For example, a first set of transformation instructions 114(1) may be configured to determine at least a portion of the output 102 responsive to a modification to the first data source 106(1). Continuing the example, a color of a particular item in the first data source 106(1) may be modified. Responsive to this modification, the first transformation instructions 114(1) may cause the item identifier for the particular item to be located in the first data source 106(1) and the corresponding color (e.g., the modified color) associated with the item identifier to be determined. The first transformation instructions 114(1) may then cause the item identifier for the particular item to be located in the output 102 due to the fact that the output 102 and the first data source 106(1) share the item identifier as a common key value. The modified value for the color attribute may then be stored in association with the item identifier as part of the output 102. Subsequent queries regarding the color of the particular item may then cause the correct, modified color to be determined from the precomputed output 102.

A second set of transformation instructions 114(2) may be configured to extract one or more values from the second data source 106(2) and store the extracted value(s) as part of the output 102. Because the output 102 includes a key value that is not included in the second data source 106(2) (e.g., "Item ID (A)"), the transformation instructions 114(2) for the second data source 106(2) may be configured to access the first data source 106(1) to determine the absent key value. For example, responsive to a modification affecting the color of a particular item, the transformation instructions 114(2) may cause a record having a particular set of attributes that correspond to the item to be located. Continuing the example, two attributes relating to the region and category of the item may function as a composite key. The corresponding color (e.g., the modified color) associated with these attributes may also be determined. Because the item identifier attribute is not included in the second data source 106(2), the transformation instructions 114(2) may cause the corresponding region and category attributes to be located in the first data source 106(1), so that the item identifier corresponding to those attributes may be determined. The item identifier may then be located in the output 102, and the determined modified color may be stored in association with the item identifier as part of the output 102.

In other implementations, the transformation instructions 114(2) associated with the second data source 106(2) may cause modification of the first data source 106(1). For example, responsive to a modified color attribute in the second data source 106(2), a corresponding record in the first data source 106(1) may be located using the common key values for the region and category of the particular item. The color attribute associated with that item may then be modified in the first data source 106(1). The output 102 may then be modified using the first data source 106(1), such as by using the process described with regard to the first transformation instructions 114(1).

In some implementations, the query determination module 112 may be configured to determine portions of the query data 104 that may be disregarded when generating the transformation instructions 114. Additionally, the query determination module 112 may be configured to determine portions of the transformation instructions 114 that may be unnecessary for generation of an accurate output 102. For example, if a set of transformation instructions 114 generated without regard to a particular portion of the query data 104 may be executed to determine an accurate output 102, then the particular portion of the query data 104 may be unnecessary for generation of transformation instructions 114. Similarly, if an accurate output 102 may be determined by executing only a portion of a set of transformation instructions 114, other portions of the transformation instructions 114 may be unnecessary for generation of an accurate output 102. The query determination module 112 may be configured to attempt to execute the transformation instructions 114 when omitting multiple elements of the query data 104 to determine each portion of the query data 104 that may be disregarded. The query determination module 112 may further be configured to attempt to execute certain portions of the transformation instructions 114 while omitting execution of other portions to determine each portion of the transformation instructions 114 that may be disregarded, thereby optimizing the transformation instructions 114 by including only necessary elements.

A query processing module 120 associated with the precomputation server 110 may generate one or more queries 122 for interrogating the data sources 106 based on the transformation instructions 114, receive responses 124 to the queries 122, and store at least a portion of the responses 124 as output 102. For example, the query processing module 120 may generate a first query 122(1) to extract particular values from the first data source 106(1). Responsive to the first query 122(1), the first data source 106(1) may provide a first response 124(1) indicative of at least a portion of the requested values. Similarly, the query processing module 120 may generate a second query 122(2) to extract particular values from the second data source 106(2). Responsive to the second query 122(2), the second data source 106(2) may provide a second response 124(2) indicative of at least a portion of the requested values. Based on the received values and the output characteristics 118, the query processing module 120 may generate or modify at least a portion of the output 102 based on the responses 124.

Figure 2:
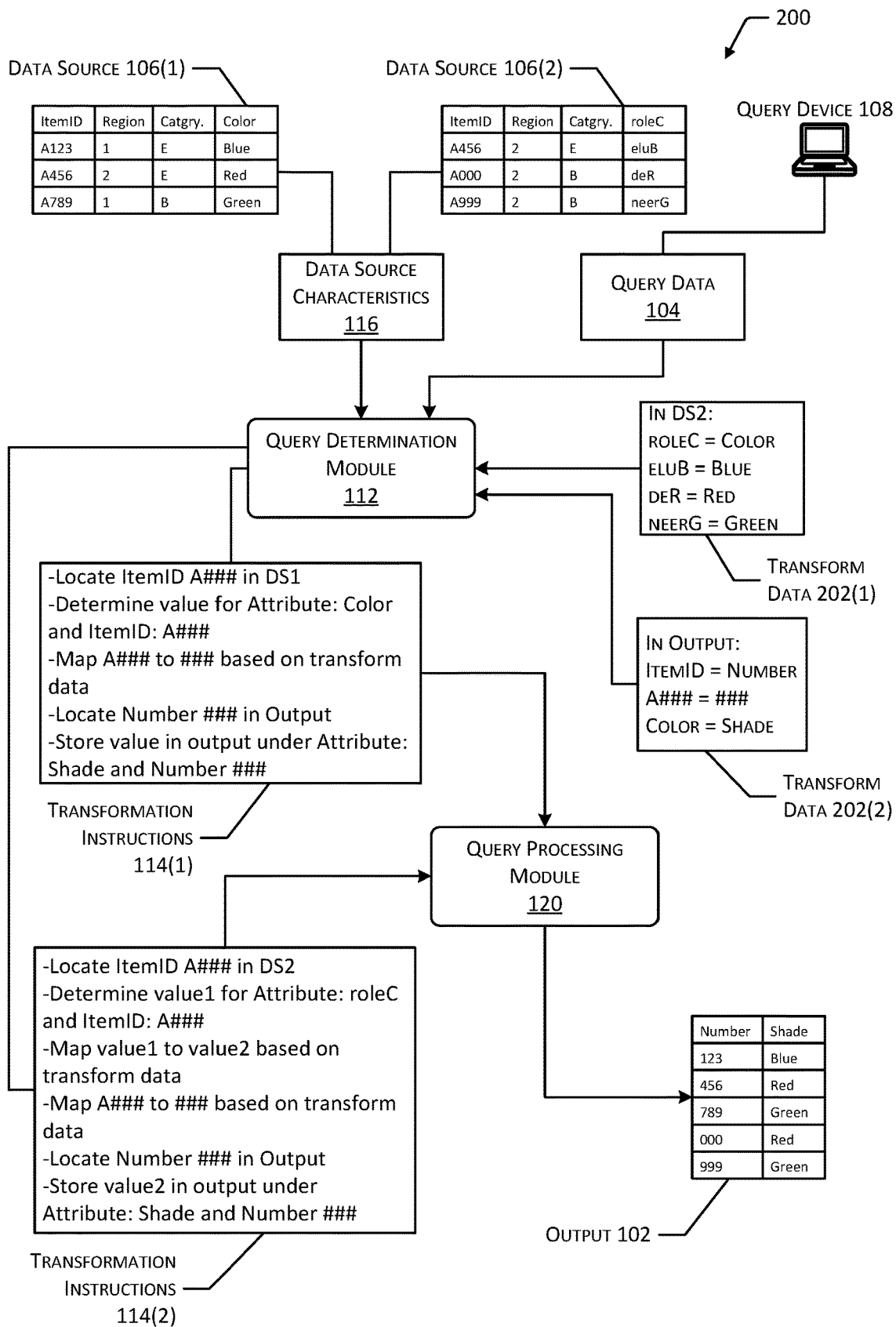
FIG. 2 depicts a system for determining transformation instructions based on data source characteristics and query data.

FIG. 2 depicts a system 200 for determining transformation instructions 114 based on data source characteristics 116 and query data 104. As described previously with regard to FIG. 1, a query device 108 may provide query data 104 to a query determination module 112 of a precomputation server 110. The query data 104 may include an indication of an output 102 to be determined, an indication of the data sources 106 from which the output 102 may be determined, and query instructions that may be used to determine portions of the output 102 from particular data sources 106. In some implementations, the query data 104 may include one or more data source characteristics 116. In other implementations, the data source characteristics 116 may be determined from the data sources 106 or may be previously stored in association with the precomputation server 110. Based on one or more of the query data 104 or the data source characteristics 116, the query determination module 112 may determine relationships between particular data sources 106 and the output 102.

For example, FIG. 2 depicts the first data source 106(1) as a database including three example records, each record having four attributes: an item identifier (e.g., "ItemID"), a region identifier (e.g., "Region"), a category (e.g., "Catgry."), and a color (e.g., "Color"). The second data source 106(2) is depicted as a database including three example records, each record having four attributes: an item identifier (e.g., "ItemID"), a region identifier (e.g., "Region"), a category (e.g., "Catgry."), and a "roleC" attribute. Continuing the example, the first data source 106(1) may include data indicative of a catalog associated with items available from an online marketplace. The second data source 106(2) may include data indicative of items available from a particular region. In the region associated with the second data source 106(2), particular colors of items may be referenced using different terms, and the colors may be associated with the "roleC" attribute.

The data source characteristics 116 determined by the query determination module 112 may indicate relationships between the data sources 106. For example, both the first data source 106(1) and the second data source 106(2) share the common key values: "ItemID", "Region", and "Catgry." In some implementations, output characteristics 118 determined from the query data 104 may be used to determine relationships between the output 102 and one or more of the data sources 106. In some cases, multiple data sources 106 or outputs 102 may share common key values; however, the manner in which a key value is formatted, positioned, identified, and so forth may differ among different data sources 106. For example, the "roleC" attribute of the second data source 106(2) may be the same key value as the "Color" attribute of the first data source 106(1), but referenced using different identifiers. In such cases, the common key values between data sources 106 may be derived using transform data 202. For example, first transform data 202(1) indicative of the relationship between the first data source 106(1) and the second data source 106(2) may be determined by the query determination module 112. In some implementations, the transform data 202(1) may be determined from the query data 104. In other implementations, the transform data 202(1) may be determined from the data source characteristics 116 or the data sources 106 themselves. In still other implementations, the transform data 202(1) may have been previously stored in association with the precomputation server 110 or may be determined by the query determination module 112 based on the values and attributes of the data sources 106. The transform data 202(1) may indicate one or more relationships, mappings, or transformations between values in the second data source 106(2) and corresponding values in the first data source 106(1). For example, the transform data 202(1) may indicate that in the second data source 106(2), the term "roleC" is used in place of "Color", the term "eluB" is used in place of "Blue", the term "deR" is used in place of "Red", and the term "neerG" is used in place of "Green".

Second transform data 202(2) may indicate the relationship between one or more of the data sources 106 and the output 102. In some implementations, the second transform data 202(2) may be determined from the query data 104. In other implementations, the second transform data 202(2) may be determined by the query determination module 112 based on the values and attributes of the data sources 106 and output 102. For example, the output 102 may include the item identifier attribute of one or more records, however the item identifier may be referenced as a "Number" attribute. Additionally, the output 102 may include item identifiers as numerals rather than alphanumeric strings. For example, for each item identifier associated with a data source 106 having the alphanumeric string "A ###", where the pound sign may represent any numeral, the output 102 may include the value "###", omitting the preceding alphabetic character(s). Further, the output 102 may include an indication of the color for one or more of the records, but the color may be referenced as a "Shade" attribute.

Based on the data source characteristics 116, the query data 104, and the transform data 202, the query determination module 112 may determine first transformation instructions 114(1) configured to query the first data source 106(1) and second transformation instructions 114(2) configured to query the second data source 106(2). Responsive to a modification to data in the first data source 106(1), the first transformation instructions 114(1) may cause an item identifier associated with a modified record to be located in the first data source 106(1). The value for the "Color" attribute that corresponds to the record having the located item identifier may then be determined. Based on the second transform data 202(2), the transformation instructions 114 (1) may map the determined item identifier (e.g., "A ###") from the first data source 106(1) to a corresponding number (e.g., "###") associated with the output 102. The transformation instructions 114(1) may then cause a record in the output 102 to be located having a "Number" attribute that corresponds to the mapped item identifier. The value determined from the first data source 106(1) for the color may be stored as part of the record corresponding to the located "Number" attribute, in association with the "Shade" attribute.

Responsive to a modification to data in the second data source 106(2), the second transformation instructions 114(2) may cause an item identifier associated with a modified record to be located in the second data source 106(2). The value for the "roleC" attribute that corresponds to the record having the located item identifier may then be determined. Based on the first transform data 202(1), the transformation instructions 114(2) may map the determined value for the "roleC" attribute (e.g., "deR") to a corresponding value (e.g., "Red") from the first data source 106(1) to a corresponding number (e.g., "###") associated with the output 102. Based on the second transform data 202(2), the transformation instructions 114(2) may map the determined item identifier (e.g., "A ###") from the second data source 106(2)

to a corresponding number (e.g., "###") associated with the output 102. The transformation instructions 114(2) may then cause a record in the output 102 to be located having a "Number" attribute that corresponds to the mapped item identifier. The value determined from the second data source 106(2) for the "roleC" attribute, transformed as indicated by the first transform data 202(1), may be stored as part of the record corresponding to the located "Number" attribute, in association with the "Shade" attribute.

Figure 3:
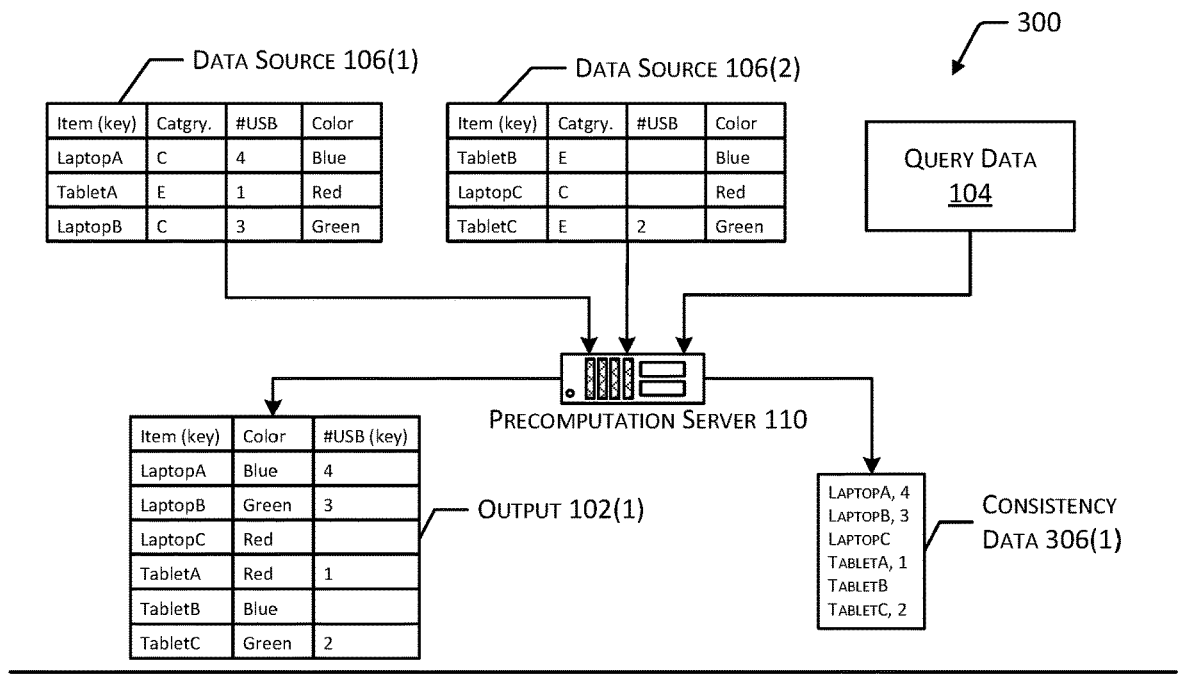
FIG. 3 depicts a system for determining portions of an output to be deleted responsive to a deletion or modification associated with a data source.
Figure 3:
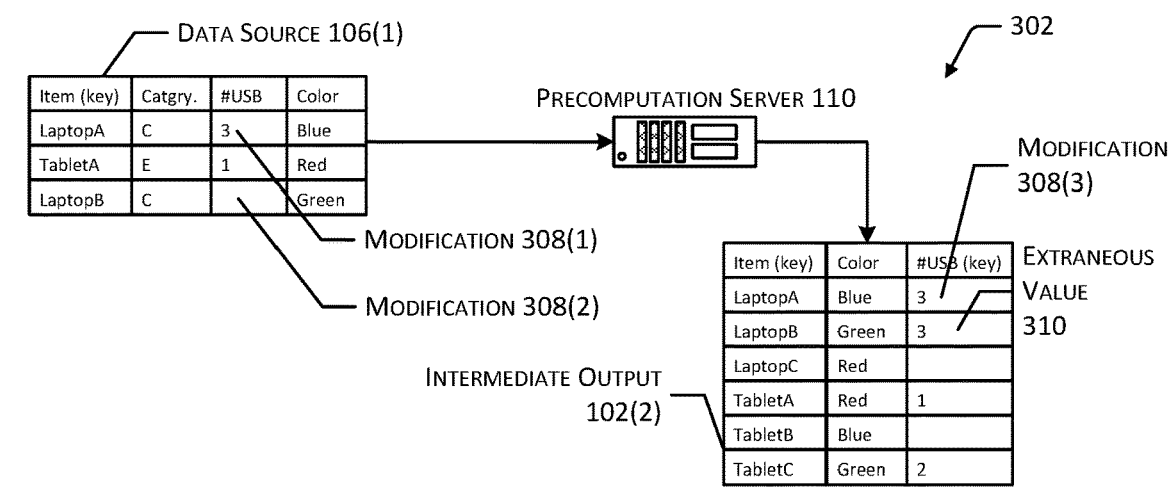
Figure 3:
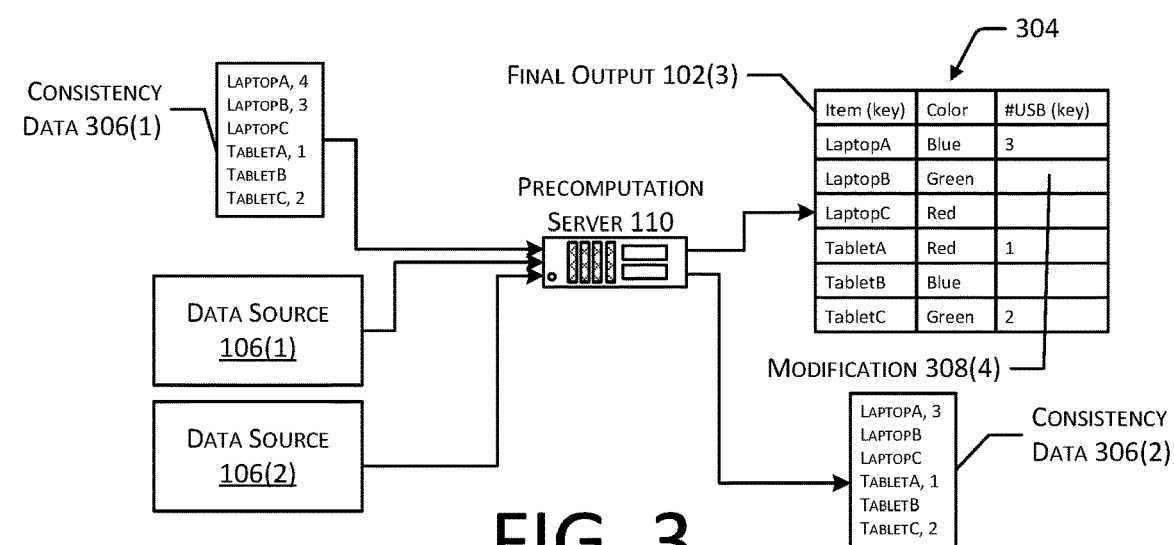

FIG. 3 depicts a system for determining portions of an output 102 to be deleted responsive to a deletion associated with a data source 106. The depicted system is illustrated at three points in time with the system shown at 300 corresponding to a first time at which a first output 102(1) is determined. The depicted system at 302 corresponds to a second time subsequent to the first time, at which an intermediate output 102(2) is determined. The depicted system at 304 corresponds to a third time subsequent to the second time, at which a final output 102(3) is determined.

At 300, a precomputation server 110 may determine query data 104 associated with a first output 102(1) to be precomputed. The query data 104 may indicate characteristics of the first output 102(1) to be determined, a first data source 106(1) and a second data source 106(2) that may be used to determine the first output 102(1), query instructions indicative of relationships between the data sources 106 and output 102, methods for accessing particular values in the data sources 106, and so forth. For example, the first output 102(1) may indicate one or more computing devices, the color of each computing device, and a number of USB ports associated with each computing device. The first output 102(1) may be represented as a database in which identifiers associated with the computing device (e.g., "Item") and the number of USB ports (e.g., "# USB") are primary key values. FIG. 3 depicts the first data source 106(1) and the second data source 106(2) as databases that each include three records, each record having four associated attributes. The attributes include a name or identifier associated with a computing device (e.g., "Item"), a category associated with the item (e.g., "Catgry."), a number of USB ports associated with the item (e.g., "# USB"), and a color associated with the item (e.g., "Color"). In the first data source 106(1) and the second data source 106(2), the identifier associated with the computing device (e.g., "Item") may be a primary key value. As shown in FIG. 3, the example second data source 106(2) lacks a value for the "# USB" attribute for two of the records.

As described previously with regard to FIGS. 1 and 2, based on the query data 104 and data in the first data source 106(1) and second data source 106(2), the precomputation server 110 may determine a first output 102(1). For example, the first output 102(1) may include at least a portion of the attribute values for at least a subset of the records stored in the data sources 106. As shown in FIG. 3, the first output 102(1) includes six records, each record having three associated attributes: an item name or identifier (e.g., "Item"), a color (e.g., "Color"), and a number of USB ports (e.g., "# USB"). For two of the records, no value for the "# USB" attribute is present. The precomputation server 110 may also determine first consistency data 306(1) based on the first output 102(1). The first consistency data 306(1) may be used to determine whether subsequent modifications to one or more of the data sources 106 may require deletion of data from an output 102 for the output 102 to remain accurate. For example, the first consistency data 306(1) may include key values associated with the first output 102(1). If, subsequent to a modification to a data source 106, the first consistency data 306(1) includes one or more values not determined by application of the transformation instructions 114, the one or more values may be extraneous.

For example, at 302, one or more modifications 308 to the first data source 106(1) may be determined. FIG. 3 depicts a first modification 308(1) that changes the value associated with the "# USB" attribute for the record having the item identifier "LaptopA" from "4" to "3". A second modification 308(2) may remove the value associated with the "# USB" attribute for the record having the item identifier "LaptopB". Responsive to the modifications 308, the precomputation server 110 may recompute the output 102 to determine an intermediate output 102(2). Based on the first modification 308(1), the intermediate output 102(2) may include a modification 308(3) associated with the record having the item identifier "LaptopA". Specifically, the value for the "# USB" attribute of the record may be modified to indicate "3" rather than "4". For example, responsive to the first modification 308(1), the precomputation server 110 may overwrite (e.g., replace) the associated value in the intermediate output 102(2). Because no value in the first data source 106(1) exists for the "# USB" attribute corresponding to the second modification 308(2), the precomputation server 110 may not determine a modified value to include in the intermediate output 102(2) when executing the transformation instructions 114. For example, due to the absent value for the "# USB" attribute in the first data source 106(1) no alternate value for this attribute may be determined by the precomputation server 110 and used to overwrite or replace the corresponding value in the intermediate output 102(2). Therefore, the value for the "# USB" attribute of the record associated with the item identifier "LaptopB" present in the first output 102(1) may not be changed in the intermediate output 102(2). The intermediate output 102(2) may retain an extraneous value 310 associated with the attribute.

At 304, the precomputation server 110 may perform an additional operation to determine and remove extraneous values 310. Based on the first data source 106(1), as affected by the modifications 308 that occurred at 302, and the second data source 106(2), the precomputation sever 110 may determine the values for an output 102 that may be determined from the data sources 106. The precomputation server 110 may then determine correspondence between these values and the first consistency data 306(1) corresponding to the first output 102(1) determined at 300. Based on this correspondence, the precomputation server 110 may determine one or more mismatches or differences between the values and the first consistency data 306(1). For example, the first consistency data 306(1) may include a value for the "# USB" attribute of the record associated with the item identifier "LaptopB". However, the values determined from the data sources 106 may not include this value. Based on this mismatch, the precomputation server 110 may determine the additional value to be an extraneous value 310 and perform an additional modification 308(4) to the intermediate output 102(2) to delete the extraneous value 310. The identified extraneous value(s) 310 may be deleted from the intermediate output 102(2) to form the final output 102(3). Based on the final output 102(3), the precomputation server 110 may generate corresponding second consistency data 306(2). For example, the second consistency data 306(2) may include the key values associated with the final output 102(3).

Figure 4:
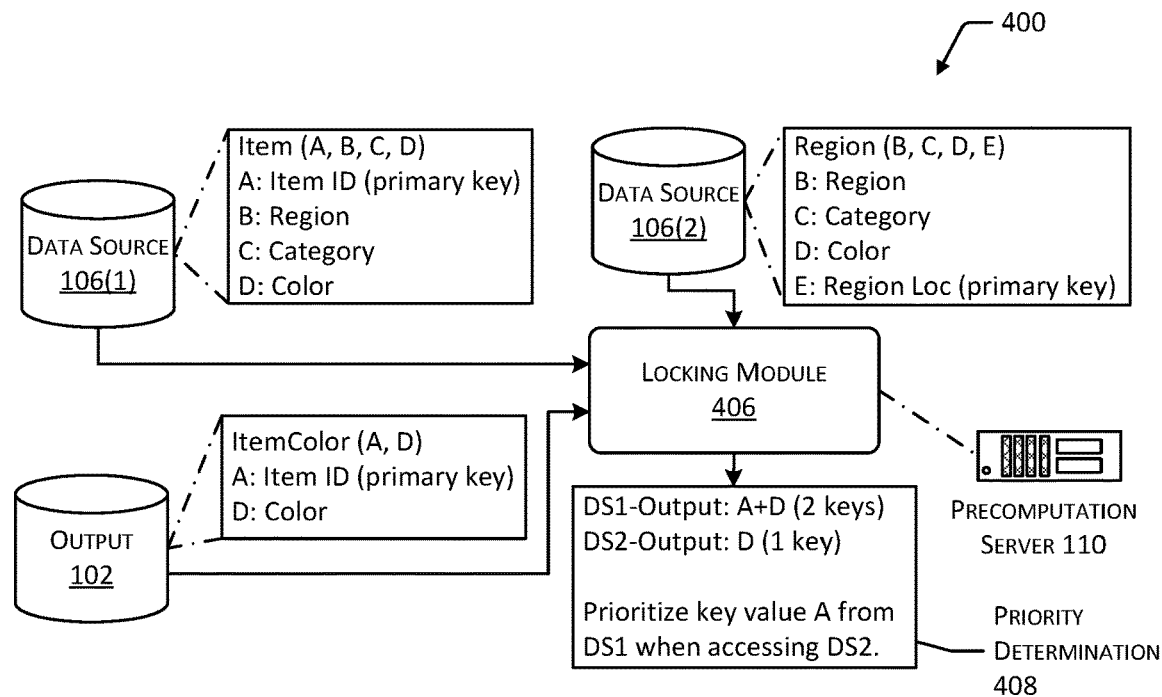
FIG. 4 depicts a system for determining a priority for key values associated with data sources when modifying an output.
Figure 4:
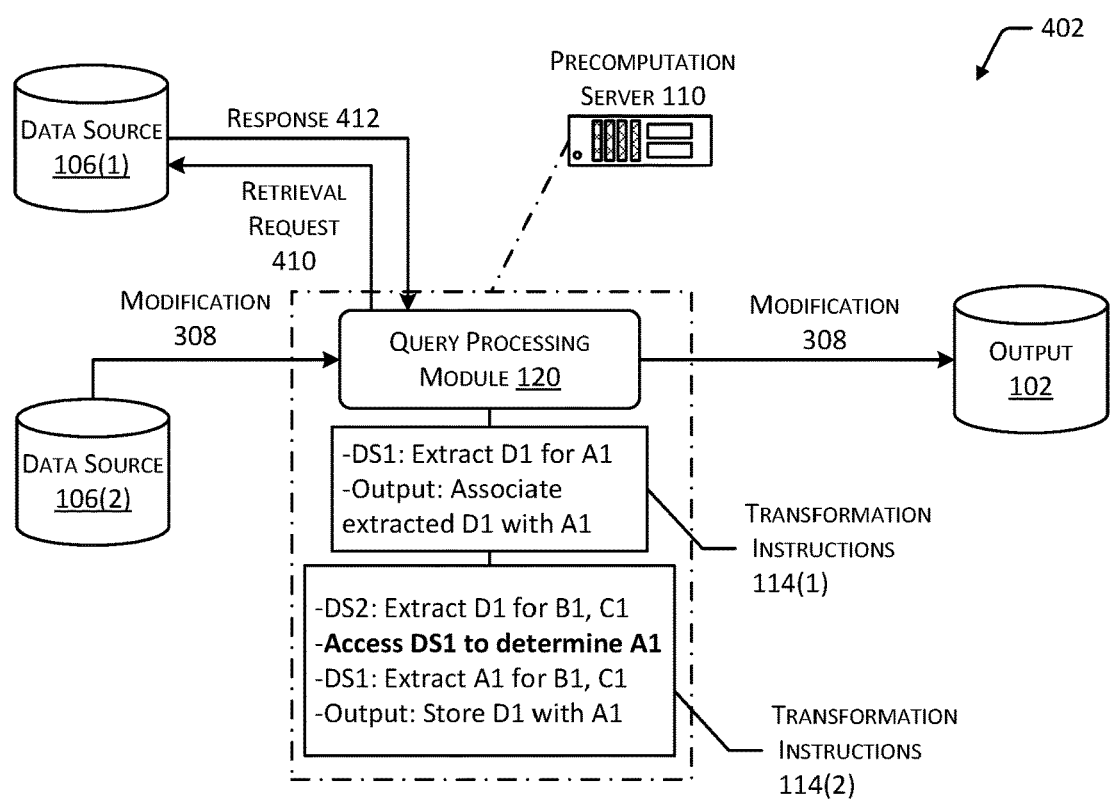

FIG. 4 depicts a system for determining a priority for key values associated with data sources 106 when modifying an output 102. As described previously, particular data sources 106 may lack key values used to update the output 102. In such cases, one or more of the data sources 106, key values, or transformation instructions 114 may be prioritized over other data sources 106, key values, or transformation instructions 114. The depicted system is illustrated at two points in time with the system shown at 400 corresponding to a first time at which the priority of a key value associated with a first data source 106(1) is determined. The depicted system at 402 corresponds to a second time subsequent to the first time, at which a process associated with the second data source 106(2) is executed, the process accessing the first data source 106(1) to determine the prioritized key value.

At 400, a locking module 406 associated with the precomputation server 110 may generate a priority determination 408 based on characteristics determined from the data sources 106 and the output 102. For example, FIG. 4 depicts the first data source 106(1) as a relational database (e.g., "Item (A, B, C, D)") that includes four attributes: an item identifier (e.g., "A: Item ID"), a region associated with sale of an item (e.g., "B: Region"), a category associated with the item (e.g., "C: Category"), and a color associated with the item (e.g., "D: Color"). The second data source 106(2) is shown as a relational database (e.g., "Region (B, C, D, E)") that includes four attributes: a region associated with sale of an item (e.g., "B: Region"), a category associated with the item (e.g., "C: Category"), a color associated with the item (e.g., "D: Color"), and a region location, such as coordinates or another specific location, of the region (e.g., "E: Region Loc"). The output 102 is shown as a database (e.g., "Item-Color (A, D)") that includes two attributes: an item identifier (e.g., "A: Item ID") and a color associated with the item (e.g., "D: Color").

The locking module 406 may determine data source characteristics 116, output characteristics 118, other types of data from the data sources 106, the query data 104, or from other data previously stored in association with the precomputation server 110. Based on the determined data, the locking module 406 may generate a priority determination 408 indicative of the priority in which data sources 106 may be accessed to determine particular key values. In some implementations, the locking module 406 may access one or more rules, algorithms, and so forth, that indicate particular characteristics of data sources 106, key values, or transformation instructions 114 and the manner in which these characteristics may be used to determine a priority value. For example, the locking module 406 may determine that the number of common attributes shared by the first data source 106(1) and the output 102 is greater than the number of common attributes shared by the second data source 106(2) and the output 102. Specifically, FIG. 4 depicts the first data source 106(1) including a common primary key value with the output 102 (e.g., "A: Item ID") that is not present in the second data source 106(2). Based on this determination, the priority determination 408 may indicate that processes related to the second data source 106(2) are to access the first data source 106(1) to determine the common key value. In other implementations, the locking module 406 may prioritize processes associated with data sources 106 having greater numbers of known key values than other data sources 106, processes associated with key values having a greater access frequency than other key values, and so forth. In still other implementations, the locking module 406 may prioritize processes based on user input. For example, user-specified priority values or hierarchies of data sources 106, key values, or transformation instructions 114 may be stored in association with the precomputation server 110.

At 402, the query processing module 120 may determine a modification 308 associated with the second data source 106(2). Responsive to the modification 308, the query processing module 120 may execute second transformation instructions 114(2) associated with the second data source 106(2). Based on the priority determination 408 generated by the locking module 406, the second transformation instructions 114(2) associated with the second data source 106(2) may be configured to cause the query processing module 120 to access the first data source 106(1) to determine a value for a particular key attribute (e.g., "A: Item ID"). In contrast, because the priority determination 408 indicates that the key value associated with the first data source 106(1) is prioritized over the second data source 106(2), the first transformation instructions 114(1) do not reference the second data source 106(2). Based on one or more of the priority determination 408 or the transformation instructions 114, at 402, the query processing module 120 may modify the output 102 based on the modification 308.

In other implementations, modifications 308 to multiple data sources 106 may occur concurrently or close-in-time, and the locking module 406 or another module associated with the precomputation server 110 may determine relationships between the modifications 308. For example, if multiple modifications 308 are associated with the same records or key values, the locking module 406 may join the processes into a single process or terminate one or more of the processes to allow a single process to modify the output 102 based on the prioritized data source 106 or key value. Continuing the example, if a particular record present in both the first data source 106(1) and the second data source 106(2) is modified, the locking module 406 may determine that the first data source 106(1) includes more key values in common with the output 102. Based on this determination, the locking module 406 may cause the process associated with the first data source 106(1) to be executed while preventing execution of the process associated with the second data source 106(2).

Figure 5:
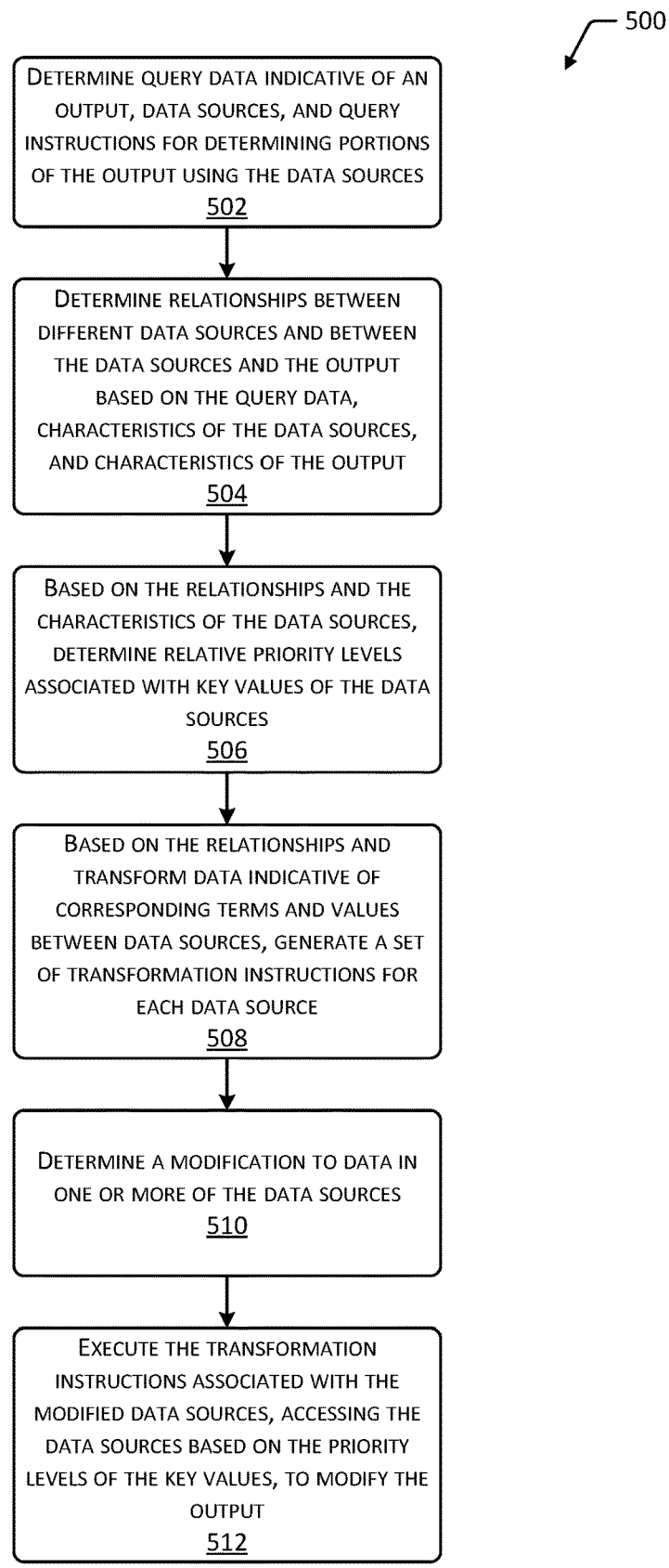
FIG. 5 is a flow diagram illustrating a method for determining transformation instructions to modify an output responsive to a modification to one or more data sources.

FIG. 5 is a flow diagram 500 illustrating a method for determining transformation instructions 114 to modify an output 102 responsive to a modification to one or more data sources 106. Block 502 determines query data 104 indicative of an output 102, data sources 106, and query instructions for determining portions of the output 102 using the data sources 106. For example, the query data 104 may indicate characteristics of the data sources 106 or of the output 102, such as key values or other attributes, formats, identifiers associated with records or attributes, query languages that may be used to access the data sources 106 or the output 102, and so forth. The query data 104 may also include indications of relationships between particular data sources 106 or between data sources 106 and the output 102. For example, such relationships may include common key values or attributes. In some implementations, relationships may include common key values that may be derived based on transform data 202 indicative of relationships between particular attributes or attribute values. For example, an attribute may be identified using a first identifier in a first data source 106(1) and a second identifier in a second data source 106(2). As another example, attribute values for common attributes may be formatted or expressed differently in a first data source 106(1) when compared to a second data source 106(2). The transform data 202 may indicate processes by which data in a particular data source 106 may be transformed or manipulated to correspond to data in a different data source 106.

Block 504 determines relationships between different data sources 106 and between the data sources 106 and the output 102 based on the query data 104, characteristics of the data sources 106, and characteristics of the output 102. For example, a query determination module 112 may determine common key values and attributes present in particular data sources 106 and the output 102. Relationships between data sources 106 may be used to determine whether a modification 308 to a first data source 106(1) may affect data associated with a second data source 106(2). Relationships between data sources 106 may also be used to determine particular values that may be updated or extracted from one data source 106 for use when executing a process associated with another data source 106. For example, a process associated with first data source 106(1) having a common key value with a second data source 106(2) may access the second data source 106(2) to determine other key values not present in the first data source 106(1). The process may then use the key values determined from both data sources 106 to locate one or more particular records in the output 102 and modify one or more values associated with the record(s).

Block 506 determines relative priority levels associated with key values of the data sources 106 based on the relationships (determined at block 504) and the characteristics of the data sources 106. As described previously with regard to FIG. 4, a locking module 406 may generate a priority determination 408 based on characteristics of the data sources 106, characteristics of the output 102, characteristics of particular attributes or values, or characteristics of the transformation instructions 114 associated with the data sources 106. For example, a process associated with a data source 106 that includes one or more common key values with the output 102 may be accessed by other data sources 106 to determine the key values. As another example, a particular key value having a greater access frequency may be provided with a greater priority level than other key values. As another example, user input indicative of priority levels or a hierarchy of data sources 106, attributes, or transformation instructions 114 may be used to determine the priority levels associated with the key values.

Block 508 generates a set of transformation instructions 114 for each data source 106 based on the relationships (determined at block 504) and transform data 202 indicative of corresponding terms and values between data sources 106. As described previously with regard to FIG. 1, transformation instructions 114 may include data indicative of a process for extracting one or more particular values from a specific data source 106, based on the relationships between the output 102, the specific data source 106, and other data sources 106. For example, transformation instructions 114 may cause a query processing module 120 to locate particular key values or other attributes in a data source 106 to determine a particular record, determine one or more attribute values associated with the record, locate particular key values or other attributes in the output 102, and store the determined attribute values as part of the output 102 in association with the located key values or other attributes. In other implementations, transformation instructions 114 may cause the query processing module 120 to access one or more additional data sources 106 to determine attributes or values not present in the specific data source 106, and to use the attributes or values determined from multiple data sources 106 to access and modify the output 102. In still other implementations, transformation instructions 114 may cause the query processing module 120 to modify a particular data source 106 based on the modification to the specific data source 106 associated with the transformation instructions 114. For example, if a record in the specific data source 106 is modified, the transformation instructions 114 may cause one or more corresponding records in other data sources 106 to be modified. The output 102 may be modified using one or more of the specific data sources 106 or at least one of the modified data sources 106. In some cases, the transformation instructions 114 may cause values or attributes of a data source 106 or the output 102 to be derived, such as by using transform data 202 to map particular terms or values in the specific data source 106 to other terms or values that correspond to other data sources 106 or to the output 102.

Block 510 determines a modification 308 to data in one or more of the data sources 106. For example, a user or a computerized process may add, delete, or change one or more values associated with a data source 106. Modification of the data in the data source(s) 106 may affect the accuracy of the output 102. Therefore, the output 102 may be recomputed based on the modified data in the data source(s) 106 to ensure the accuracy thereof. Block 512 executes the transformation instructions 114 associated with the modified data source(s) 106, accessing the data sources 106 based on the priority levels of the key values, to modify the output 102.

Figure 6:
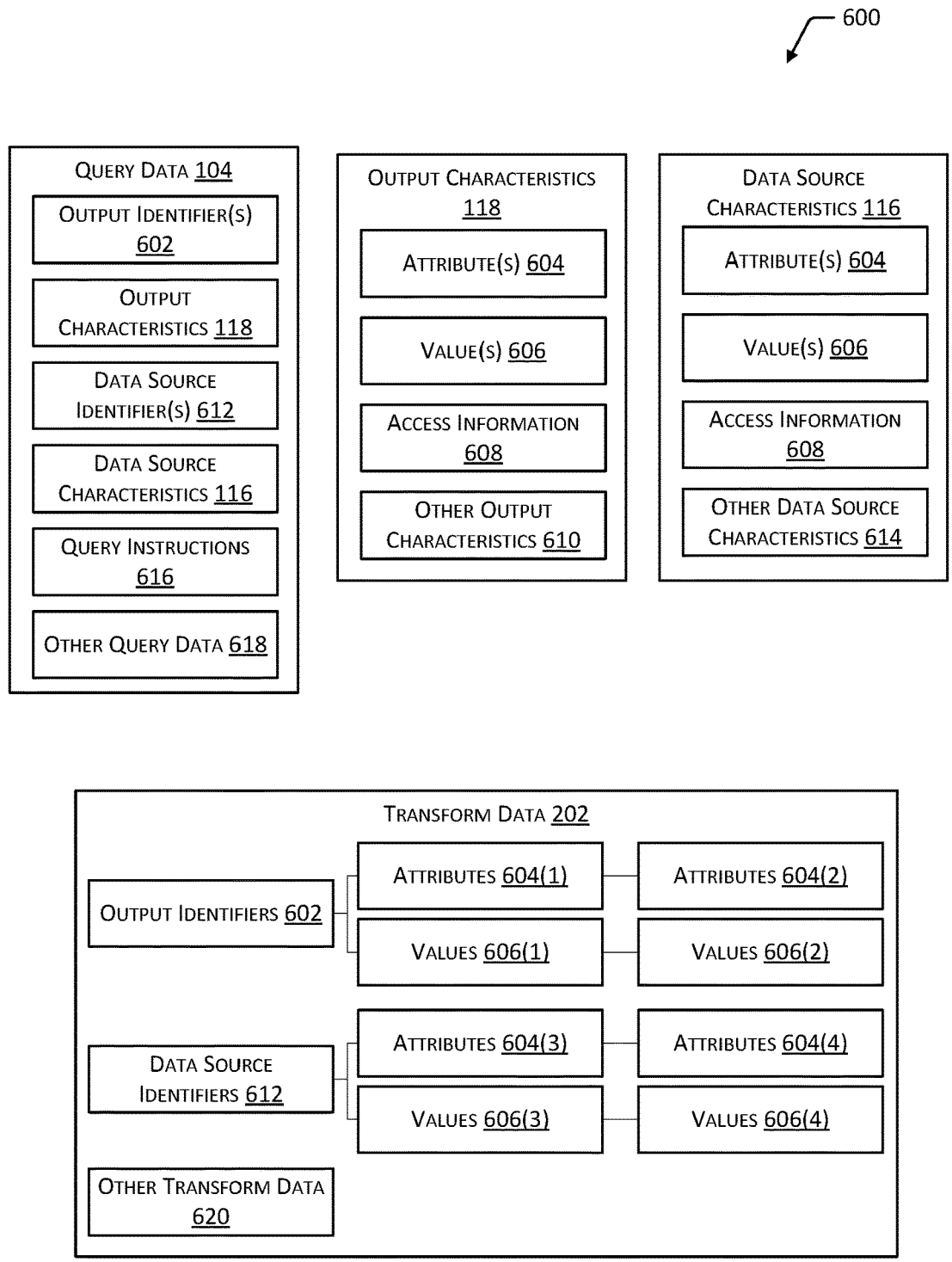
FIG. 6 depicts block diagrams illustrating example query data, data source characteristics, output characteristics, and transform data.

FIG. 6 depicts block diagrams 600 illustrating example query data 104, data source characteristics 116, output characteristics 118, and transform data 202. The query data 104 may include data associated with a query for determining an output 102 based on multiple data sources 106. The query data 104 may include one or more output identifiers 602 indicative of the output 102. Output identifiers 602 may include one or more of alphanumeric data, audio data, image data, metadata, or other types of data, including without limitation, data that may be determined by a computing device without necessarily being understandable by a human user. The output identifier(s) 602 may indicate particular data stores in which the output 102 is stored, computing devices associated with or used to access the output 102, a title or name associated with the output 102, and so forth.

The query data 104 may also include an indication of output characteristics 118, which may include indications of attributes 604 associated with the output 102, values 606 associated with the attributes 604, and access information 608 associated with accessing the output 102. Access information 608 may include, for example, networks, communication channels, or communication devices that may be used to access the output 102, query languages that may be used to interact with the output 102, access credentials or other security features associated with the output 102, and so forth. Other output characteristics 610 may include access data indicative of previous accesses to the output 102, the particular values 606 that were accessed, the frequency of access of the output 102 or of particular values 606, a log of modifications 308 associated with the output 102, version information associated with the output 102, and so forth. Other output characteristics 610 may also include an indication of particular attributes 604 that may be used as key values for the output 102.

The query data 104 may additionally include one or more data source identifiers 612 indicative of one or more data sources 106 that may be used to determine the output 102. Data source identifiers 612 may include one or more of alphanumeric data, audio data, image data, metadata, or other types of data, including without limitation, data that may be determined by a computing device without necessarily being understandable by a human user. For example, the data source identifier(s) 612 may indicate particular computing devices or hardware associated with the data sources 106, such as network addresses, device names, device identifiers, and so forth. As another example, the data source identifier(s) 612 may indicate a title or name associated with one or more of the data sources 106.

The query data 104 may also include an indication of data source characteristics 116, which may include indications of attributes 604, values 606, and access information 608 associated with the data source(s) 106. Access information 608 may include, for example, networks, communication channels, communication devices, query languages, security features, and so forth that may be associated with access to one or more data sources 106. Other data source characteristics 614 may include data indicative of previous accesses to the data source 106, the particular values 606 that were accessed, the frequency of access, a log of modifications 308 associated with the data source 106, and so forth. Other data source characteristics 614 may also include an indication of particular attributes 604 that may be used as key values for the output 102.

The query data 104 may further include query instructions 616. As described previously with regard to FIG. 1, query instructions 616 may include indications of code, logic, processes, and so forth, that may locate particular records within a data source 106, extract values from the located records, and store the values in association with other records as part of the output 102. The query instructions 616 may indicate relationships between different data sources 106 and between data sources 106 and the output 102, such as common key values or attributes, transformations that may be performed to derive common key values or attributes, and so forth.

Other query data 618 may include identifiers or other data indicative of a user or device associated with generation or transmission of the query data 104. Other query data 618 may also include indications of transform data 202 that may be used to determine corresponding attributes 604 and values 606 within data sources 106 that may be identified, formatted, or positioned differently in different data sources 106.

Transform data 202 may be used to derive relationships between data sources 106, such as common key values or other attributes 604. For example, transform data 202 may map particular terms (e.g., identifiers), attributes 604, or values 606 associated with a first data source 106(1) to corresponding terms, attributes 604, or values 606 in a second data source 106(2). In some implementations, the transform data 202 may indicate that substitution of a particular term for another may be used to derive common attributes 604 or other relationships between data sources 106. In other implementations, the transform data 202 may indicate modifications, processes, algorithms, and so forth that may be applied to values 606 or other data in a first data source 106(1) to determine corresponding values 606 or other data associated with a second data source 106(2).

For example, the transform data 202 may include output identifiers 602 indicative of particular outputs 102 and data source identifiers 612 indicative of particular data sources 106. Each identifier may include a first set of attributes 604 and values 606, and a corresponding set of attributes 604 and values 606 that may be mapped to the first set. FIG. 6 depicts an example output identifier 602 having a first set of attributes 604(1) that corresponds to a second set of attributes 604(2). The output identifier 602 may also include a first set of values 606(1) that corresponds to a second set of values 606(2). Similarly, FIG. 6 depicts an example data source identifier 612 having an initial set of attributes 604(3) and an initial set of values 606(3). The initial set of attributes 604(3) and the initial set of values 606(3) may correspond to a derived set of attributes 604(4) and a derived set of values 606(4), respectively.

Other transform data 620 may include algorithms, equations, code, and so forth that may be used to map particular attributes 604 or values 606 to other attributes 604 or values 606. For example, a particular value 606 may map to different corresponding values 606 based on different rules or circumstances, which may be indicated in an algorithm, code, or similar data structure.

Figure 7:
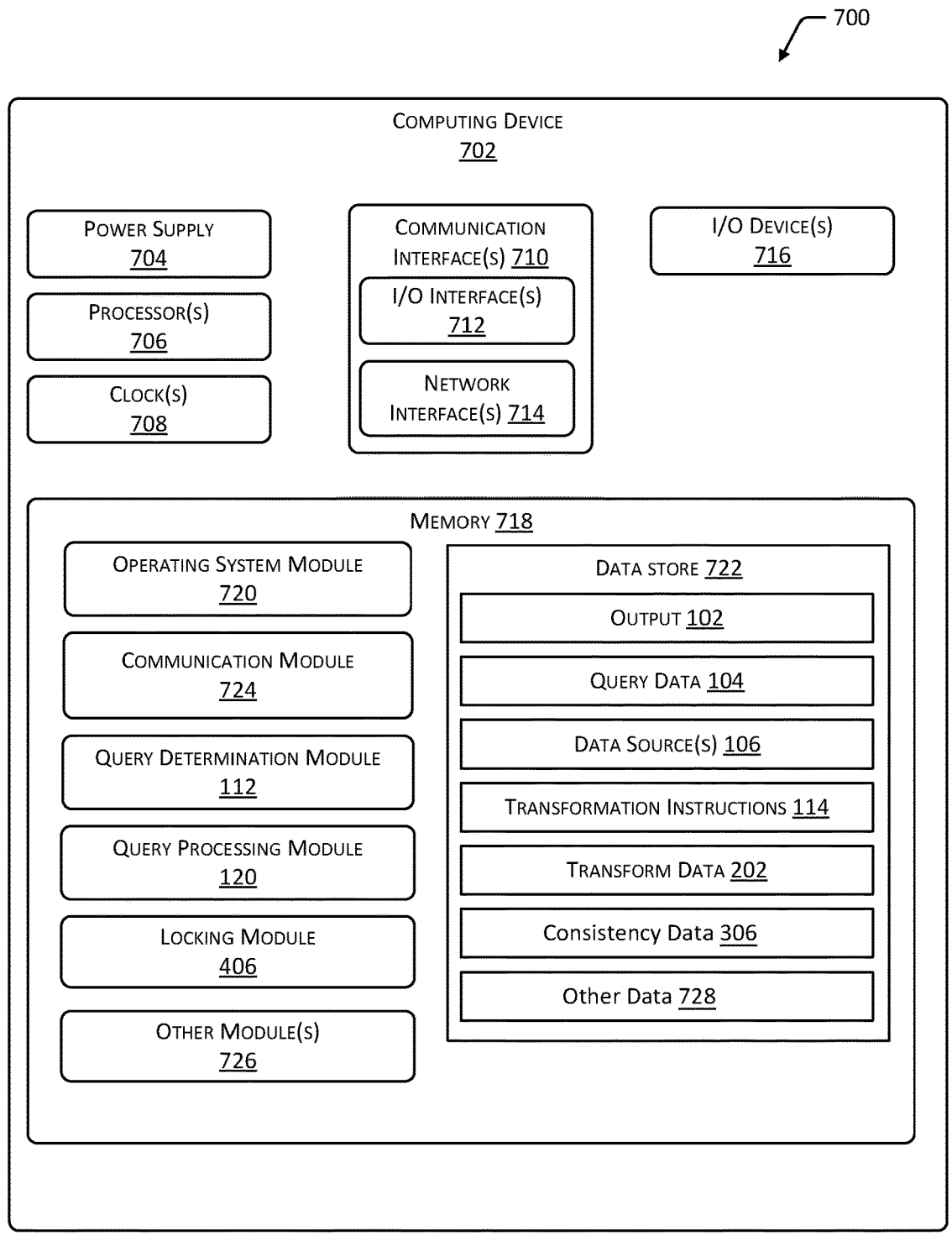
FIG. 7 is a block diagram illustrating a computing device within the scope of the present disclosure.

FIG. 7 is a block diagram 700 illustrating a computing device 702 within the scope of the present disclosure. The computing device 702 may include one or more precomputation servers 110, query devices 108, or other computing devices 702 used to access data sources 106 or data stores storing output 102.

One or more power supplies 704 may be configured to provide electrical power suitable for operating the components of the computing device 702. In some implementations, the power supply 704 may include a rechargeable battery, fuel cell, photovoltaic cell, power conditioning circuitry, and so forth.

The computing device 702 may include one or more hardware processor(s) 706 (processors) configured to execute one or more stored instructions. The processor(s) 706 may include one or more cores. One or more clocks 708 may provide information indicative of date, time, ticks, and so forth. For example, the processor(s) 706 may use data from the clock 708 to generate a timestamp, trigger a preprogrammed action, and so forth.

The computing device 702 may include one or more communication interfaces 710, such as input/output (I/O) interfaces 712, network interfaces 714, and so forth. The communication interfaces 710 may enable the computing device 702, or components of the computing device 702, to communicate with other computing devices 702 or components of the other computing devices 702. The I/O interfaces 712 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 712 may couple to one or more I/O devices 716. The I/O devices 716 may include any manner of input device or output device associated with the computing device 702. For example, I/O devices 716 may include touch sensors, keyboards, mouse devices, microphones, image sensors (e.g., cameras), scanners, displays, speakers, haptic devices, printers, and so forth. In some implementations, the I/O devices 716 may be physically incorporated with the computing device 702 or may be externally placed.

The network interfaces 714 may be configured to provide communications between the computing device 702 and other devices, such as the I/O devices 716, routers, access points, and so forth. The network interfaces 714 may include devices configured to couple to one or more networks including Local Area Networks (LANs), wireless LANs, Wide Area Networks (WANs), wireless WANs, and so forth. For example, the network interfaces 714 may include devices compatible with Ethernet, Wi-Fi, Bluetooth, ZigBee, Z-Wave, 3G, 4G, LTE, and so forth.

The computing device 702 may include one or more busses or other internal communications hardware or software that allows for the transfer of data between the various modules and components of the computing device 702.

As shown in FIG. 7, the computing device 702 may include one or more memories 718. The memory 718 may include one or more computer-readable storage media (CRSM). The CRSM may be any one or more of an electronic storage medium, a magnetic storage medium, an optical storage medium, a quantum storage medium, a mechanical computer storage medium, and so forth. The memory 718 may provide storage of computer-readable instructions, data structures, program modules, and other data for the operation of the computing device 702. A few example modules are shown stored in the memory 718, although the same functionality may alternatively be implemented in hardware, firmware, or as a system on a chip (SoC).

The memory 718 may include one or more operating system (OS) modules 720. The OS module 720 may be configured to manage hardware resource devices such as the I/O interfaces 712, the network interfaces 714, the I/O devices 716, and to provide various services to applications or modules executing on the processors 706. The OS module 720 may implement a variant of the FreeBSD™ operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 722 and one or more of the following modules may also be stored in the memory 718. The modules may be executed as foreground applications, background tasks, daemons, and so forth. The data store 722 may use a flat file, database, linked list, tree, executable code, script, or other data structure to store information. In some implementations, the data store 722 or a portion of the data store 722 may be distributed across one or more other devices including other computing devices 702, network attached storage devices, and so forth.

A communication module 724 may be configured to establish communications with one or more other computing devices 702. The communications may be authenticated, encrypted, and so forth.

The memory 718 may store the query determination module 112. The query determination module 112 may access query data 104 and determine characteristics associated with the data source(s) 106 and the output 102. Based on at least a portion of this data, the query determination module 112 may generate transformation instructions 114 that may be used to modify the output 102 responsive to a modification to a particular data source 106. For example, transformation instructions 114 specific to a particular data source 106 may access particular records or values 606 of the data source 106 using known key values, extract or modify values 606, and store or modify values 606 associated with the output 102 based on the values 606 determined from the data source 106.

The memory 718 may also store the query processing module 120. The query processing module 120 may be configured to determine one or more modifications 308 associated with a data source 106. Responsive to a modification 308, the query processing module 120 may execute the transformation instructions 114 to cause generation of a query 122 to access the data source 106 in a manner indicated by the transformation instructions 114. The query processing module 120 may determine a response 124 from the data source 106 and add, modify, or delete a portion of the output 102 based on the response 124. In some implementations, the query processing module 120 may access transform data 202 to determine common key values or other relationships between data sources 106 and output 102. In other implementations, the query processing module 120 may be configured to compare a previous version of an output 102 with current values 606 determined from data sources 106 to determine the presence or absence of extraneous values 310 in an output 102. If one or more extraneous values 310 are determined, the query processing module 120 may delete the extraneous values 310.

The memory 718 may further include the locking module 406. The locking module 406 may determine priority levels associated with particular data sources 106, attributes 604, or transformation instructions 114. For example, data sources 106 that share a greater number of common key values with the output 102 may be accessed by processes associated with data sources 106 that share smaller numbers of common key values with the output 102. As another example, data sources 106 having a greater number of known key values may be accessed by processes associated with data sources 106 having a smaller number of known key values. As yet another example, data sources 106 or attributes 604 having a greater frequency of access or a higher user-assigned priority level may be accessed by processes associated with data sources 106 or attributes 604 having lower access frequencies or a lower user-assigned priority level. If multiple modifications 308 are determined concurrently, the locking module 406 may cause a certain process to be executed prior to other processes, join multiple processes, or cancel extraneous processes if execution of a prioritized process is sufficient to maintain the accuracy of the output 102.

Other modules 726 may also be present in the memory 718. For example, encryption modules may be used to encrypt and decrypt communications between computing devices 702. Authentication modules may be used to authenticate communications sent or received by computing devices 702. Other modules 726 may further include remote processing modules for providing data to remote computing devices 702 or CRSM to enable modification of an output 102 to be performed remotely without interfering with the routine functions of the data sources 106 or output 102. The other modules 726 may also include modules for logging the version of outputs 102. For example, an output 102 may be modified by a more recent process while an earlier process updates the output 102 on a remote computing device 702. The query processing module 120 or another module associated with the computing device 702 may determine indications of updates that occurred during execution of the process to update the output 102 on a remote device. Based on the indications of updates, the query processing module 120 may refrain from modifying portions of the output 102 that were updated subsequent to the time when the process on the remote computing device 102 began.

Other data 728 within the data store 722 may include user input data, such as configurations and settings associated with computing devices 702. Other data 728 may include security data, such as encryption keys and schema, access credentials, and so forth. Other data 728 may also include priority data indicative of determined or user-input priority levels associated with data sources 106 or attributes 604.

In different implementations, different computing devices 702 may have different capabilities or capacities. For example, precomputation servers 110 may have significantly more processor 706 capability and memory 718 capacity compared to the processor 706 capability and memory 718 capacity of requesting devices 108.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors configured to execute the computer-executable instructions to:
access query data including:
data indicative of output to be determined;
data indicative of a first data source and a second data source used to determine the output; and
one or more query instructions to determine the output by:
accessing the first data source based on a first key value to extract at least a first portion of the output; and
accessing the second data source based on a second key value to extract at least a second portion of the output;
determine the first data source and the second data source to be dynamic data sources;
determine, based on the one or more query instructions, the first key value associated with the first data source, the second key value associated with the second data source, and an output key value associated with the output;
determine, based on correspondence between the first key value and the output key value, first transformation instructions that:
access at least a portion of the first data source associated with the first key value;
determine the at least first portion of the output based on the at least portion of the first data source; and
associate the at least first portion of the output with the output key value;
determine, based on correspondence between the second key value and the output key value, second transformation instructions that:
access at least a portion of the second data source associated with the second key value;
determine the at least second portion of the output based on the at least portion of the second data source; and
associate the at least second portion of the output with the output key value;
determine a modification to data associated with the at least portion of the first data source; and
based on the modification, execute the first transformation instructions to determine a modified value for the at least first portion of the output.

2. The system of claim 1, further comprising computer-executable instructions to:
determine the at least portion of the second data source to further be associated with the first key value; and
wherein the first transformation instructions further include to access the second data source to determine the second key value and to determine the at least first portion of the output using the first key value and the second key value.

3. The system of claim 1, further comprising computer-executable instructions to:
determine the at least portion of the second data source to further be associated with the first key value;
determine the second data source to be associated with a count of key values greater than a count of key values of the first data source; and
based on the determination of the second data source to be associated with the count of key values greater than the count of key values of the first data source, configure the first transformation instructions to access the second data source to determine at least one key value.

4. The system of claim 1, further comprising computer-executable instructions to:

determine a mismatch between the modified value for the at least first portion of the output and a previous value associated with the at least first portion of the output, the mismatch indicates that additional data associated with the previous value is not associated with the modified value; and based on the mismatch, delete the additional data from the output.

5. A system comprising:

one or more memories storing computer-executable instructions; and one or more hardware processors configured to execute the computer-executable instructions to:

access query instructions that determine an output by accessing a first data source based on a first key value and a second data source based on a second key value;

determine, based on correspondence between the first key value and an output key value associated with the output, first transformation instructions that:

access at least a portion of the first data source associated with the first key value; and determine at least a first portion of the output based on the at least portion of the first data source;

determine, based on correspondence between the second key value and the output key value, second transformation instructions that:

access at least a portion of the second data source associated with the second key value; and determine at least a second portion of the output based on the at least portion of the second data source;

configure the first transformation instructions to determine a modified value for the at least first portion of the output responsive to a modification to data associated with the at least portion of the first data source; and configure the second transformation instructions to determine a modified value for the at least second portion of the output responsive to a modification to data associated with the at least portion of the second data source.

6. The system of claim 5, wherein the second transformation instructions further include to:

modify the first data source based on the at least portion of the second data source to form a modified first data source; and determine the at least second portion of the output based on the modified first data source.

7. The system of claim 5, further comprising computer-executable instructions to:

determine that the at least portion of the first data source to further be associated with the second key value; and wherein the second transformation instructions further include to access the first data source to determine the first key value and to determine the at least second portion of the output using the first key value and the second key value.

8. The system of claim 5, further comprising computer-executable instructions to:

determine that the first data source is associated with a first count of key values;

determine that the second data source is associated with a second count of key values less than the first count of key values; and based on the second count of key values being less than the first count of key values, configure the second transformation instructions to access the first data source to determine at least one key value.

9. The system of claim 5, further comprising computer-executable instructions to:

determine one or more of an access frequency or a priority level associated with the first key value to be greater than one or more of an access frequency or a priority level associated with the second key value; and based on the one or more of the access frequency or the priority level associated with the first key value being greater than the one or more of the access frequency or the priority level associated with the second key value, configure the second transformation instructions to access the first data source to determine the first key value.

10. The system of claim 5, further comprising computer-executable instructions to:

determine the modification to the data associated with the at least portion of the second data source; and execute the second transformation instructions to determine the modified value for the at least second portion of the output.

11. The system of claim 5, further comprising computer-executable instructions to:

execute the second transformation instructions responsive to the modification to the data associated with the at least portion of the second data source to determine the modified value for the at least second portion of the output;

determine a difference between the modified value and a previous value associated with the at least second portion of the output, the difference indicating additional data associated with the previous value; and delete the additional data from the modified value.

12. The system of claim 5, further comprising computer-executable instructions to:

determine the at least portion of the first data source to further be associated with the second key value;

determine the second key value to be common to the first data source and the second data source;

determine a first modification to the at least portion of the first data source;

determine a second modification to the at least portion of the second data source;

determine the first data source to be associated with a first count of key values greater than a second count of key values of the second data source; and based on the second key value being common to the first data source and the second data source and the first count of key values being greater than the second count of key values, execute the first transformation instructions to determine the output based on the first modification and the second modification.

13. The system of claim 5, further comprising computer-executable instructions to:

determine the modification to the data associated with the at least portion of the second data source;

provide one or more of the at least portion of the second data source, the at least first portion of the output, the at least second portion of the output, or the second transformation instructions to a device remote from the second data source;

execute the second transformation instructions on the device remote from the second data source to determine the modified value for the at least second portion of the output;

determine a second modification to the second data source, the second modification affecting particular data in the second data source;

generate an indication of one or more of the second modification or the particular data;

determine correspondence between the modified value for the at least second portion of the output and the particular data;

remove a portion of the modified value corresponding to the particular data; and provide the modified value for the at least second portion of the output, to the second data source, from the device remote from the second data source.

14. A method comprising:

accessing instructions to determine an output by accessing a first data source based on a first key value and a second data source based on a second key value;

determining, based on correspondence between the first value and the second value, first transformation instructions for determining at least a first portion of an output based on at least a portion of the first data source associated with the first key value;

determining, based on correspondence between a third key value and the second key value, second transformation instructions for determining at least a second portion of the output based on at least a portion of the second data source associated with the third key value;

determining, based on the first transformation instructions, a first value for the at least first portion of the output responsive to a first change to data within the at least portion of the first data source; and determining, based on the second transformation instructions, a second value for the at least second portion of the output responsive to a second change to data within the at least portion of the second data source.

15. The method of claim 14, further comprising:

generating a third data source based on the at least portion of the second data source; and determining the at least second portion of the output based on the third data source.

16. The method of claim 14, further comprising:

determining a third change to the second data source, the third change affecting particular data in the second data source;

generating an indication associated with the third change to the particular data;

determining correspondence between the second value for the at least second portion of the output and the particular data; and removing a portion of the second value corresponding to the particular data.

17. The method of claim 14, further comprising:

determining that the first data source is associated with a first count of key values;

determining that the second data source is associated with a second count of key values less than the first count of key values; and based on the second count of key values being less than the first count of key values, determining, based on the second transformation instructions, at least one key value based on the first data source.

18. The method of claim 14, further comprising:

determining one or more of an access frequency or a priority level associated with the first key value to be greater than one or more of an access frequency or a priority level associated with the third key value; and based on the one or more of the access frequency or the priority level associated with the first key value being greater than the one or more of the access frequency or the priority level associated with the third key value, determining, based on the second transformation instructions, the first key value based on the first data source.

19. The method of claim 14, further comprising:

determining that the at least portion of the first data source is further associated with the third value;

determining that the third key value corresponds to a value in the first data source and the second data source;

determining a third change to the at least portion of the first data source;

determining a fourth change to the at least portion of the second data source;

determining that the first data source is associated with a first count of key values greater than a second count of key values of the second data source; and based on the third key value corresponding to the value and the first count of key values being greater than the second count of key values, determining the output based on the third change and the fourth change.

20. The method of claim 14, further comprising computer-executable instructions to:

determining a difference between the first value and a third value associated with the at least second portion of the output, the difference indicating an additional value associated with the third value; and removing the additional value from the at least second portion of the output.

* * * * *